US010910904B2

(12) United States Patent
Grasso et al.

(10) Patent No.: US 10,910,904 B2
(45) Date of Patent: Feb. 2, 2021

(54) ELECTRICAL CONNECTOR AND MOTOR HAVING THE SAME (71) Applicant: Johnson Electric S.A., Murten (CH)

(72) Inventors: Bruno Grasso, Asti (IT); Carlo Canuto, Asti (IT)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 466 days.

(21) Appl. No.: 15/698,168

(22) Filed: Sep. 7, 2017

(65) Prior Publication Data
US 2018/0069447 A1    Mar. 8, 2018

(30) Foreign Application Priority Data

Sep. 7, 2016 (IT) .......................... 202016000090487

(51) Int. Cl.
H02K 3/50     (2006.01)
H02K 3/02     (2006.01)
H02K 3/52     (2006.01)
H02K 5/22     (2006.01)
H02K 29/08    (2006.01)

(52) U.S. Cl.
CPC ............... *H02K 3/50* (2013.01); *H02K 3/02* (2013.01); *H02K 3/522* (2013.01); *H02K 5/225* (2013.01); *H02K 29/08* (2013.01); *H02K 2203/09* (2013.01); *H02K 2203/12* (2013.01)

(58) Field of Classification Search
CPC ............ H02K 3/50; H02K 3/02; H02K 3/522; H02K 5/225; H02K 29/08; H02K 2203/09; H02K 2203/12; H01R 13/02; H01R 13/502; H01R 13/73; H01R 2201/10

USPC .......................................................... 310/71
See application file for complete search history.

(56) References Cited

U.S. PATENT DOCUMENTS 6,183,222 B1*   2/2001  Izzo ..................... F04D 25/08
                                                      417/423.14
2013/0156619 A1* 6/2013  Speretta .............. F04D 13/0693
                                                      417/423.7
2017/0126096 A1* 5/2017  Capoulun ................ H02K 5/15
2017/0291298 A1* 10/2017 Saitou ....................... B25J 9/12
2018/0034341 A1* 2/2018  Petrucci ............. H02K 15/0062

FOREIGN PATENT DOCUMENTS

CN       1972092 A      5/2007
CN       101588103 A    11/2009
CN       202817945 U    3/2013

OTHER PUBLICATIONS

Received STIC search reports from EIC 2800 searcher John Digeronimo dated Jul. 10, 2019 and Jul. 11, 2019 for claims 1 and 8. (Year: 2019).*

* cited by examiner

Primary Examiner — Shawki S Ismail
Assistant Examiner — Htet Z Kyaw
(74) Attorney, Agent, or Firm — Muncy, Geissler, Olds and Lowe, P.C.

(57) ABSTRACT

An electrical connector for connecting a motor and a cable connector, includes an electrically insulating main body and a plurality of electrical terminals. The main body includes a front side and a rear side configured to be engaged with a corresponding cable connector. The front side of the main body includes a mounting portion, which is configured to be stably mounted on the seat, so that the electrical terminals can be placed in a stable connection with corresponding motor terminals.

13 Claims, 11 Drawing Sheets

ELECTRICAL CONNECTOR AND MOTOR HAVING THE SAME

CROSS REFERENCE TO RELATED APPLICATIONS

This non-provisional patent application claims priority under 35 U.S.C. § 119(a) from Patent Application No. 202016000090487 filed in Italy on Sep. 7, 2016, the entire contents of which are hereby incorporated by reference.

FIELD OF THE INVENTION

This invention relates to an electrical connector and a motor having the same, in particular, a brushless motor.

BACKGROUND OF THE INVENTION

Brushless motors are widely used in many technical fields, particularly in fan units of motor vehicles, configure to drive blades. The Brushless motor typically includes a motor body and a seat extending outwardly from the motor body. A plurality of motor terminals are fixed in the seat, for receiving power supply and/or control signals, and thus driving the motor and/or controlling rotation parameters of the motor, such as rotation speed, rotation direction, rotation angle, etc. The brushless motor further includes a plurality of wires, each of which need to be aligned with the corresponding motor terminal, and then welded thereto, to provide said power supply and/or said control signals.

However, said operation process is complicated, and thus increasing the cost of the motor.

SUMMARY OF THE INVENTION

Hence there is a desire for an electrical connector and motor, which make it possible to remedy this problem.

Accordingly, in one aspect thereof, the present invention provides an electrical connector for connecting a motor and a cable connector. The motor comprises a seat in which a plurality of motor terminals is fixed. The electrical connector comprises an electrically insulating main body and a plurality of electrical terminals fixed by the main body. The main body comprises a front side, and a rear side configured to be engaged with a corresponding cable connector. Each of the electrical terminals comprises a front end protruded from the front side to connect corresponding motor terminal, and a rear end to connect corresponding end of the cable connector. The front side of the main body comprises a mounting portion which is configured to be stably mounted on the seat, so that the front ends of the electrical terminals can be placed in a stable connection with corresponding motor terminals.

Preferably, the front end of each electrical terminal directly contacts the motor terminal without welding.

Preferably, the rear side of the main body is a socket in which the rear ends of the electrical terminals located, and the cable connector is a plug.

Preferably, the mounting portion is substantially in a plate shape with two longitudinal grooves at two opposite sides thereof, the seat has two corresponding guide rails and an opening therebetween.

Preferably, the main body is made of molded plastic material.

Preferably, the main body further comprises a retention frame extending horizontally forward from the mounting portion, configured to engage with the motor.

Preferably, there are three or four electrical terminals.

Accordingly, in another aspect thereof, the present invention provides a motor comprising a seat in which a plurality of motor teitninals fixed and an electrical connector for connecting the motor and a cable connector. The electrical connector comprises an electrically insulating main body and a plurality of electrical terminals fixed by the main body. The main body comprises a front side, and a rear side configured to be engaged with a corresponding cable connector. Each of the electrical terminals comprises a front end protruded from the front side to connect corresponding motor terminal, and a rear end to connect corresponding end of the cable connector. The electrical connector is stably mounted on the seat, so that the front ends of the electrical terminals are placed in a stable connection with the motor terminals.

Preferably, the front end of each electrical terminal directly contacts the motor terminal without welding.

Preferably, the motor is a brushless motor.

Preferably, the rear side of the main body is a socket in which the rear ends of the electrical terminals located, and the cable connector is a plug.

Preferably, distal ends of the rear ends in the rear side of the main body are mutually aligned.

Preferably, the main body further comprises a mounting portion, the seat comprises a corresponding retaining portion, and the mounting portion is mounted on the retaining portion.

In the embodiments of the present disclosure, the motor is mounted with the electrical connector, which has the rear side configured to be engaged with the cable connector, and thus establishing a simply connection with the cable connector. In addition, the electrical connector can be stably mounted on the motor, so that the electrical terminals can be placed in a stable connection with corresponding motor terminals.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component. The directional phraseologies such as "perpendicular", "horizontal", "left", "right" or similar expressions are for the purposes of illustration only.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Referring to FIG. 1 to FIG. 8, a motor according to the first embodiment of the present invention is illustrated. In the drawings, reference number 1 indicates a motor. Preferably, the motor 1 is a brushless motor. The motor 1 may be mounted to a fan unit 10 of a motor vehicle (not shown), configure to drive blades 9 of the fan unit 10.

Figure 3:
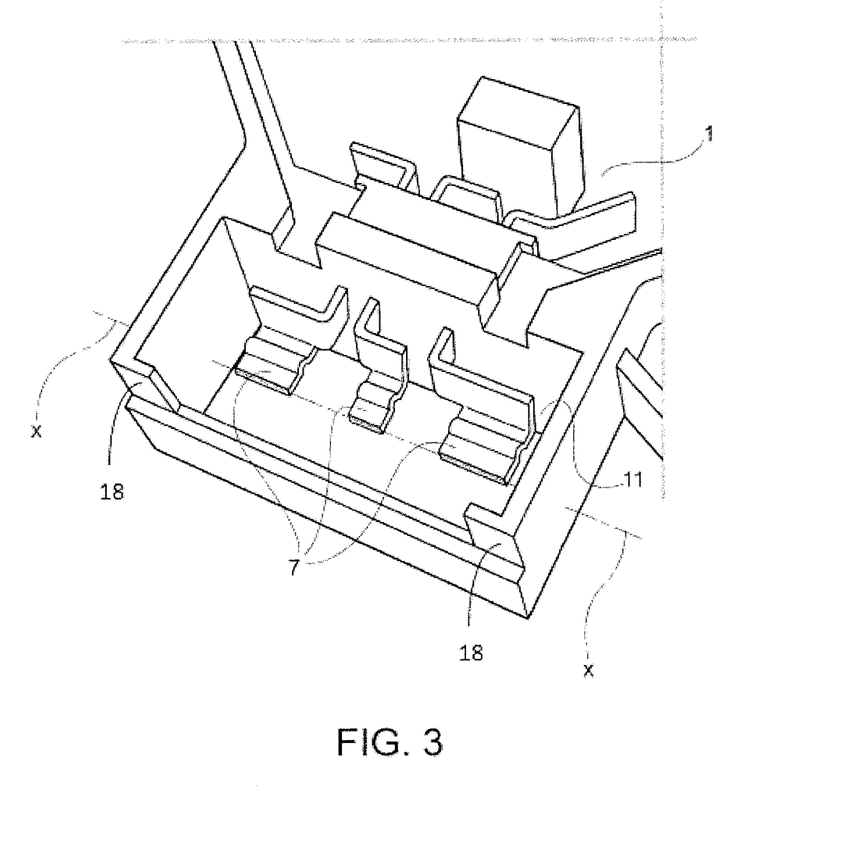
FIG. 3 is an enlarged perspective view of a seat of the brushless motor of FIG. 2.
Figure 4:
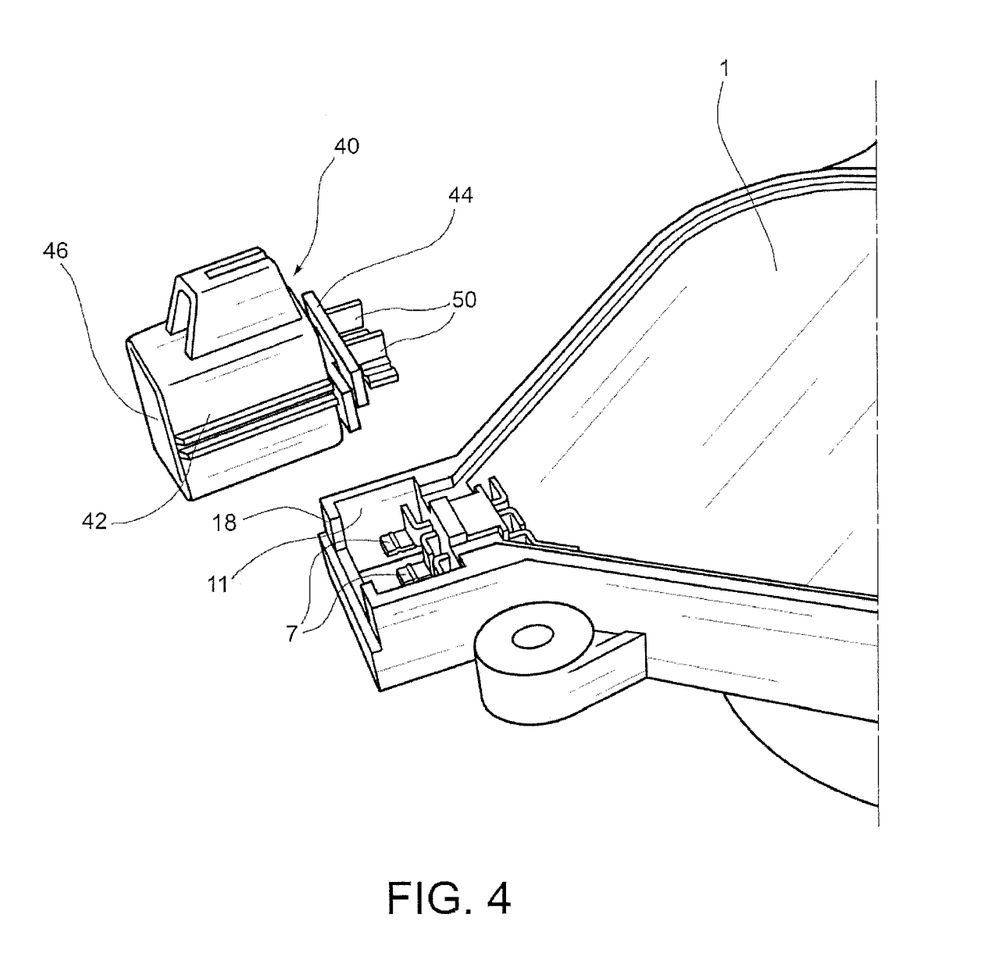
FIG. 4 is a partially exploded view of the brushless motor of FIG. 2.

The motor 1 includes a seat 11, which may be extending outwardly from a motor body (not labeled) of the motor 1. Referring to FIG. 3, a plurality of motor terminals 7 are fixed in the seat 11, for receiving power supply and/or control signals, and thus driving the motor 1 and/or controlling rotation parameters of the motor 1, such as rotation speed, rotation direction, rotation angle, etc. Preferably, the distal ends of the rear ends 54 in the rear side 46 of the main body 42 are mutually aligned in a predetermined direction x-x. In the first embodiment, the motor terminals 7 are arranged along a common plane parallel to a bottom surface of the seat 11.

Figure 8:
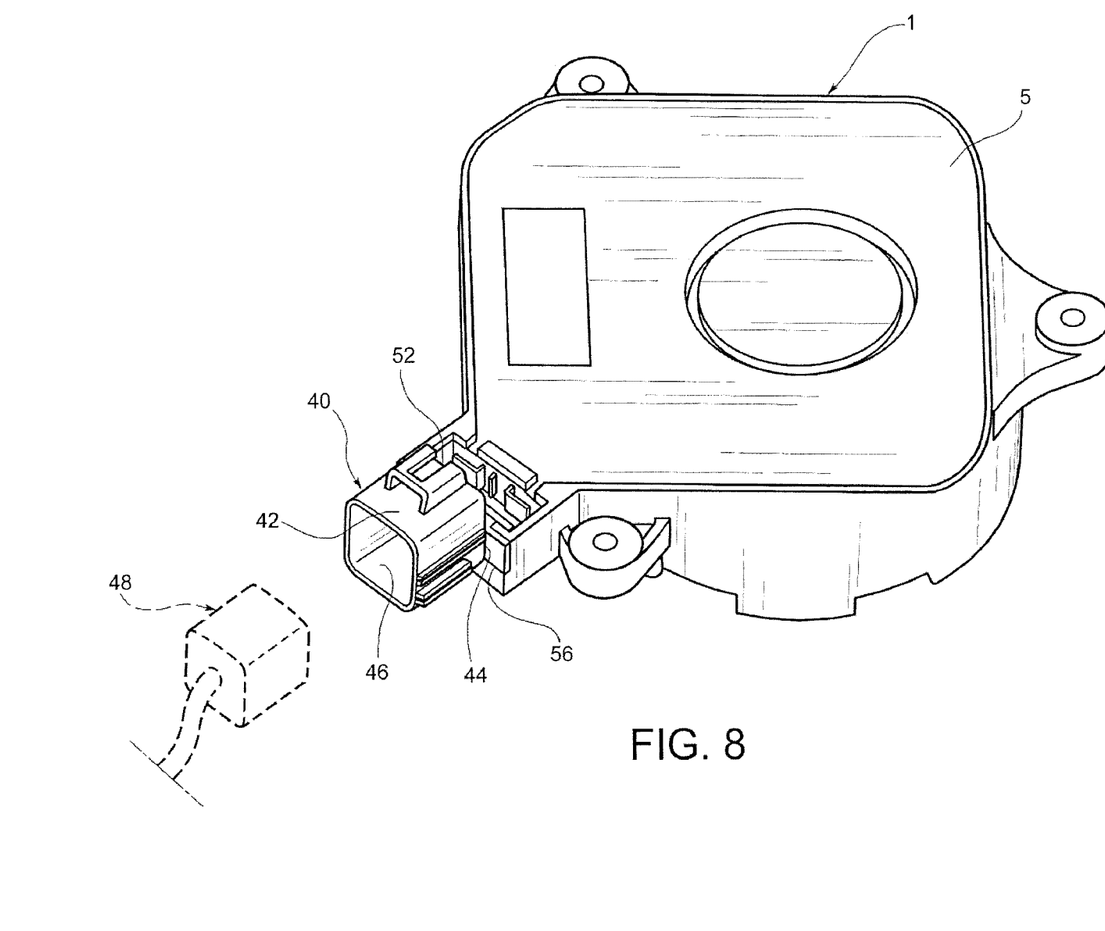
FIG. 8 is a perspective view of the blushless motor of FIG. 1.
Figure 9:
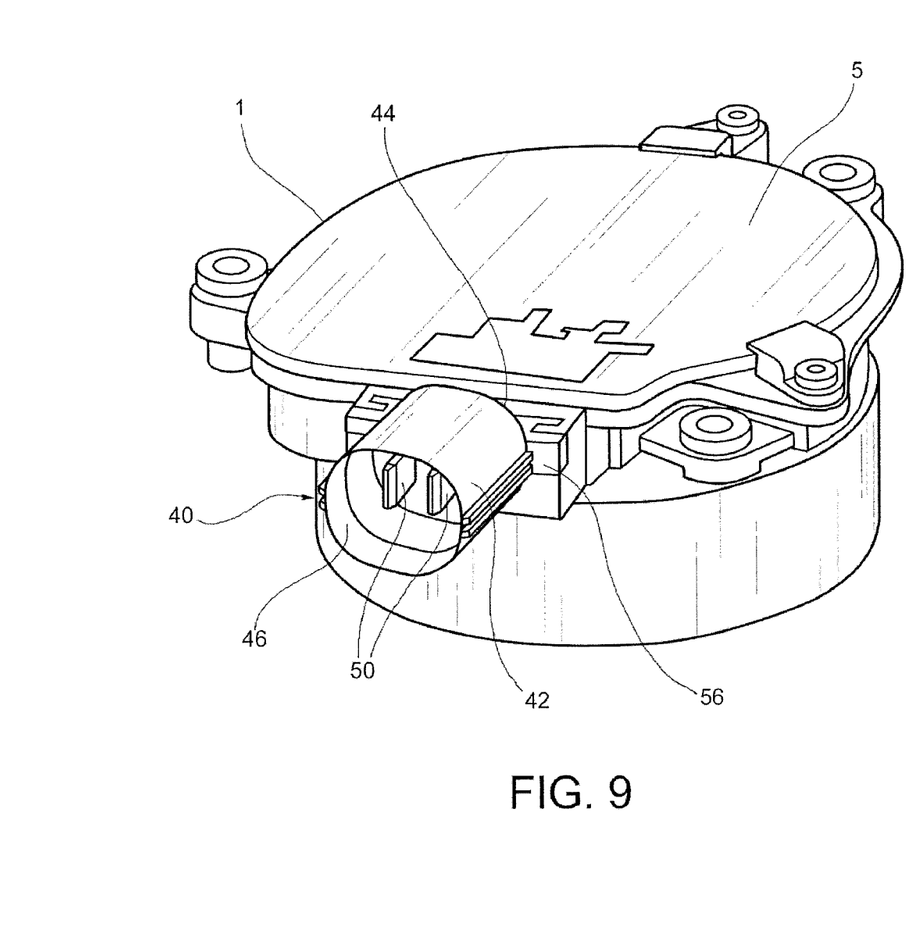
FIG. 9 is a perspective view of an alternate blushless motor according to a second embodiment of present disclosure.
Figure 10:
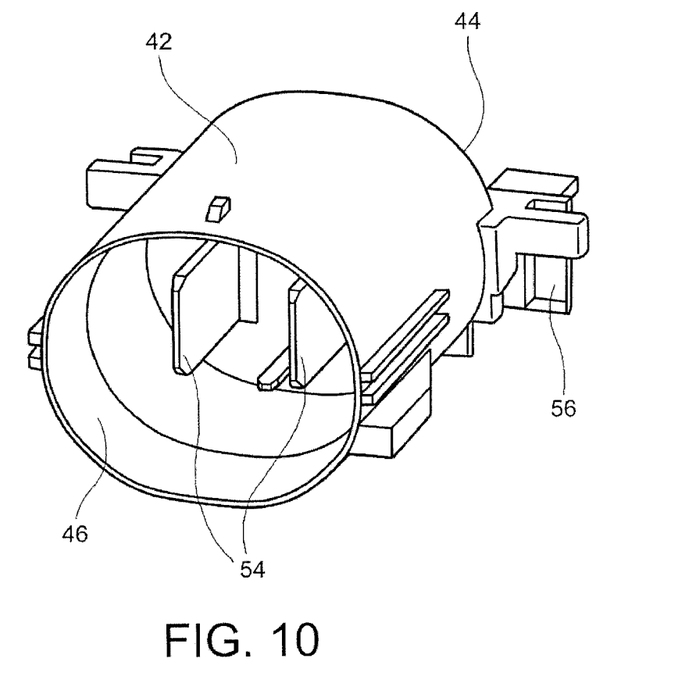
FIG. 10 is a perspective view of an electrical connector of the motor of FIG. 9.
Figure 11:
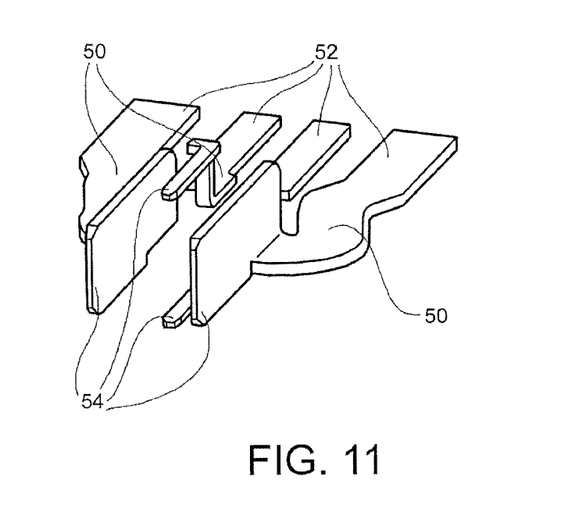
FIG. 11 illustrates a plurality of electrical terminals of the electrical connector in FIG. 10.
Figure 12:
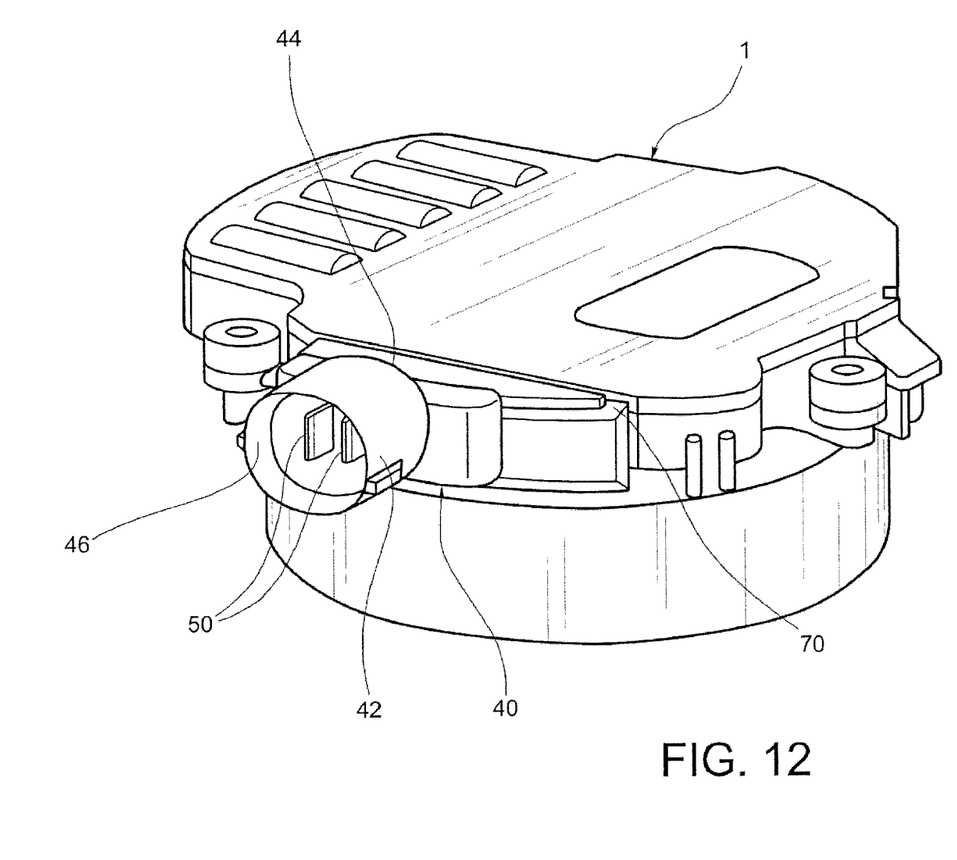
FIG. 12 is a perspective view of an alternate blushless motor according to a third embodiment of the present disclosure.

Referring to FIG. 8, the motor 1 further includes an electrical connector 40, which is configured to establish an electrical connection between the motor terminals 7 and a cable connector 48. The cable connector 48 includes a plurality of ends for transmitting the power supply signals which may be from a battery (not shown) of a vehicle, and/or control signals which may be from a control unit (not shown).

The electrical connector 40 includes a substantially rigid main body 42 made of electrically insulating material, and a plurality of mutually insulated electrical terminals 50. The main body 42 includes a front side 44 configured to be mounted on the seat 11 of the motor 1 and a rear side 46 configured to be engaged with the cable connector 48. The main body 42 may be made of molded plastic material. In this first embodiment, the main body 42 has a substantially square cross-section. There are three mutually electrically insulated electrical terminals 50.

Figure 1:
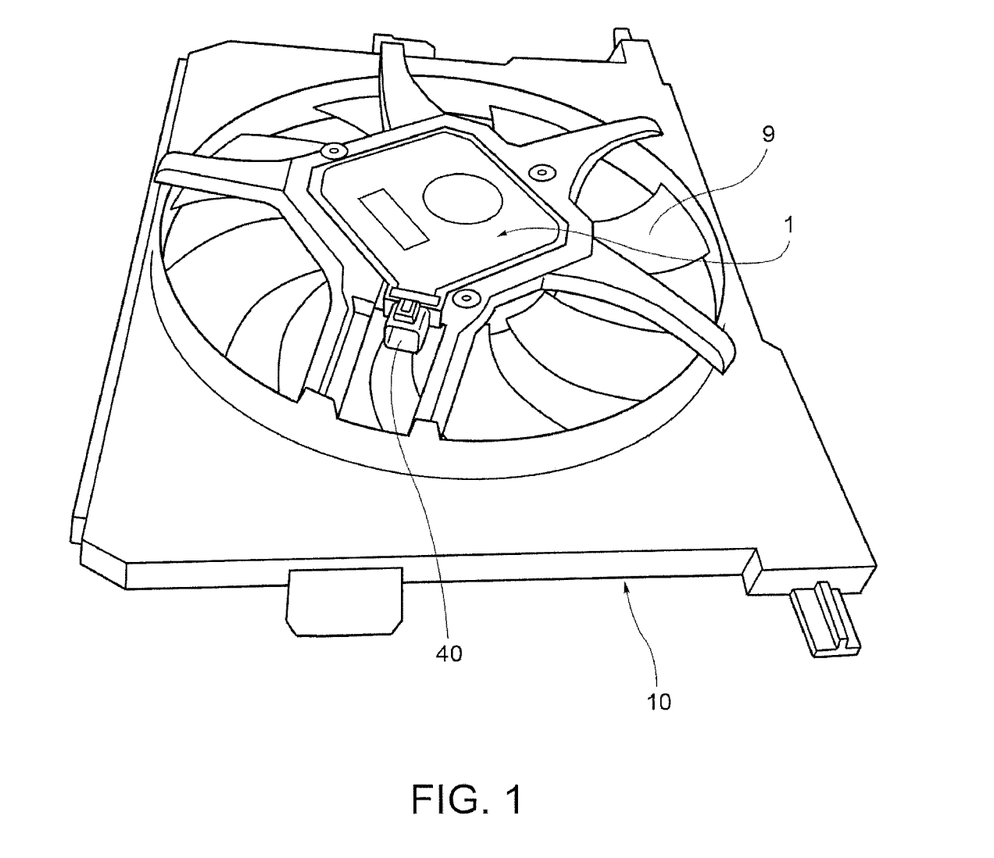
FIG. 1 is a perspective view of a ventilation unit for a heat exchanger of a motor vehicle with a brushless motor according to a first embodiment of the present disclosure.
Figure 2:
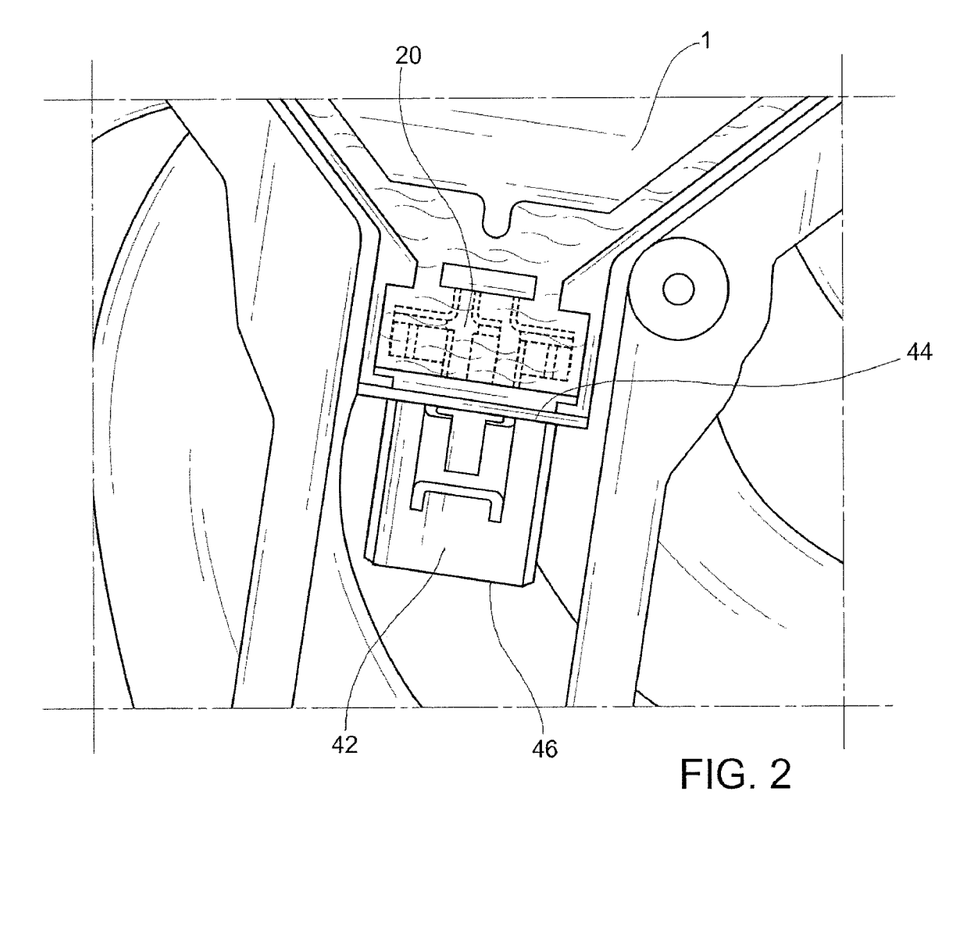
FIG. 2 is a partial, top view showing details of an electrical connection between a seat and an electrical connector of the brushless motor of FIG. 1, wherein the electrical connector is stably mounted to the seat.

The electrical terminals 50 are fixed by the main body 42. As shown in FIG. 2, an insulating resin 20 may be injected into the seat 11 to cover the front ends 52 of the electrical terminals 50 and the motor terminals 7 in the seat 11, to further ensure that the electrical connector 40 is stably mounted on the seat 11 and the electrical terminals are insulated. The electrical terminals 50 include a plurality of power terminals. In this first embodiment, the electrical terminals 50 further include at least one signal terminal. Preferably, each of the power terminals 50 has a larger dimension than the signal terminal 50.

Figure 5:
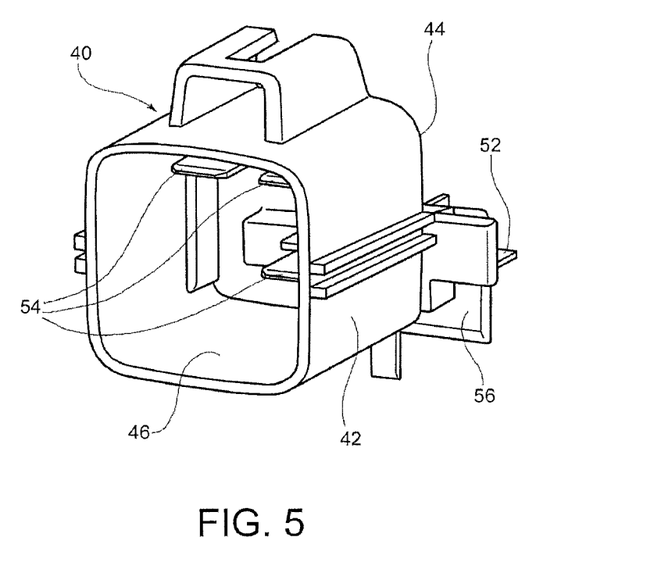
FIG. 5 is a front prospective view of the electrical connector of FIG. 4.
Figure 6:
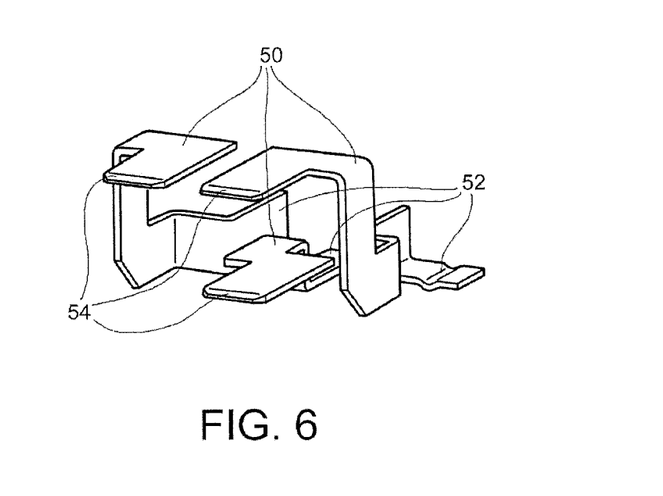
FIG. 6 illustrates a plurality of electrical terminals of the electrical connector in FIG. 5.
Figure 7:
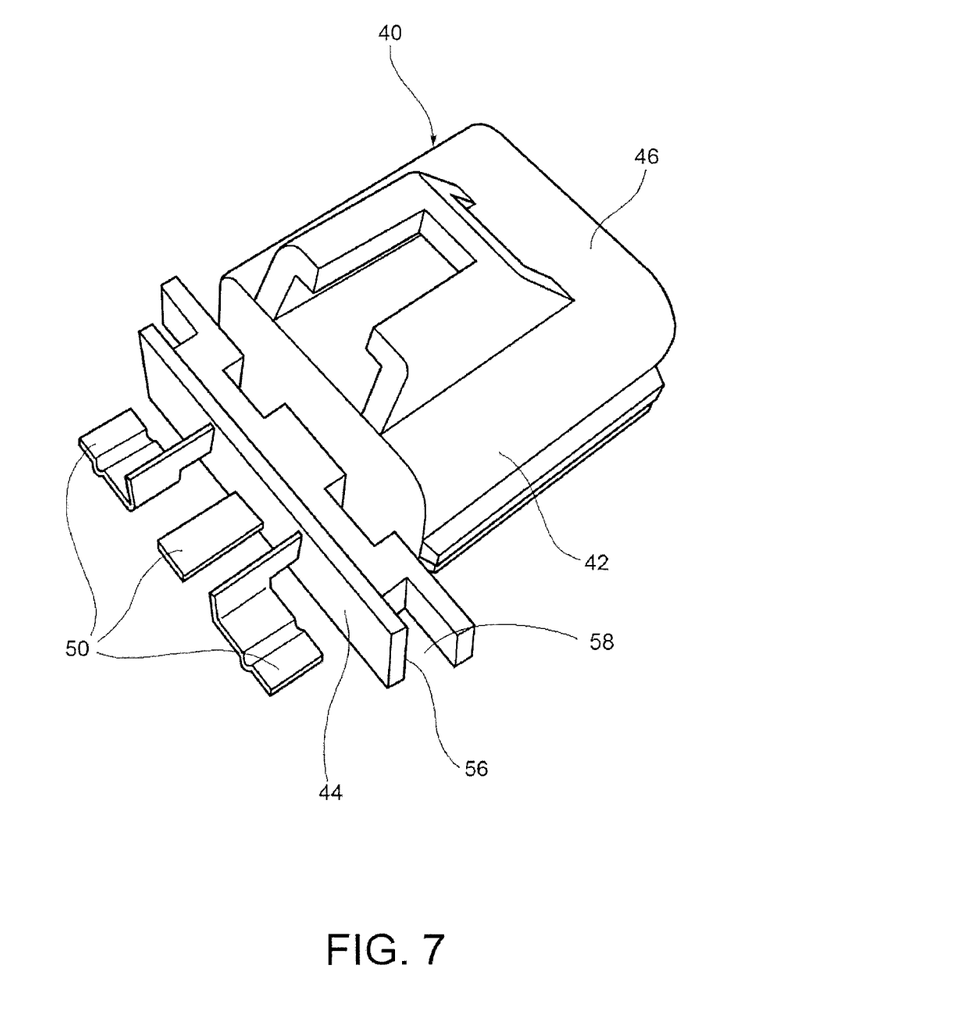
FIG. 7 is another perspective view of the electrical connector of FIG. 4.

Referring to FIG. 5 and FIG. 6, each of the electrical terminals 50 includes a front end 52 protruded from the main body 42 to connect corresponding motor terminal 7, and a rear end 54 located in the main body 42 to connect corresponding terminal of the cable connector 48.

In the embodiment, the cable connector 48 is a plug, and the rear side of the main body 42 is a socket. In alternative embodiments, the cable connector 48 also may be a socket, and the rear side of the main body 42 is a plug.

The main body 42 is stably mounted on the seat 11 of the motor 1, so that the front ends 52 of the electrical terminals 50 can stably contact the corresponding motor terminals 7, forming a stable electric connection.

Advantageously, the motor 1 is mounted with the electrical connector 40, which has the rear side 46 configured to be engaged with the cable connector 48, and thus establishing a simply connection with the cable connector 48. In addition, the electrical connector 40 can be stably mounted on the motor 1, so that the electrical terminals 50 can stably contact corresponding motor terminals 7. There is no need to align each motor terminal 7.

In some embodiment, each of the front ends 52 is connected with the motor terminal 7 only by direct contact, need not to be welded to the motor terminal 7, and thus the connection operation can be further simplified.

In the first embodiment, the front side 44 of the main body 42 includes a mounting portion 56. The mounting portion 56 is substantially in a plate shape. There are two longitudinal grooves 58 respectively formed at two opposite sides of the mounting portion 56. The seat 11 of the motor 1 has two guide rails 18 to be inserted in the corresponding grooves 58 and an opening (not labeled) therebetween. The mounting portion 56 is stably mounted on the seat 11 of the motor 1 in a sliding manner along a longitudinal direction. The front ends 52 are stably placed on the motor terminals 7, and maintained in a stable electric connection with the motor terminals 7. In alternative embodiments, the main body 3 also can be stably mounted on the seat 11 by other formations, such as interlocking hooks or screw.

Referring to FIG. 9 to FIG. 14, illustrate two alternate brushless motors with two alternate electrical connectors. In these embodiments, the electrical connector 40 includes four electrical terminals 50, which are two power terminals and two signal terminals. The main body 42 has a substantially circular cross section. Correspondingly, the brushless motors 1 have corresponding motor terminals (not shown) and seats to couple with corresponding electrical connectors 40.

Figure 13:
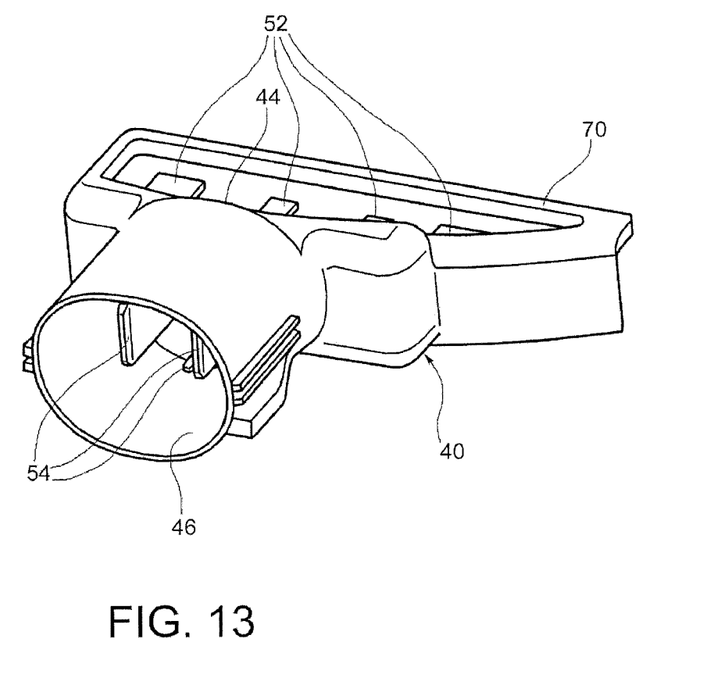
FIG. 13 is a prospective view of an electrical connector of the motor of FIG. 12.
Figure 14:
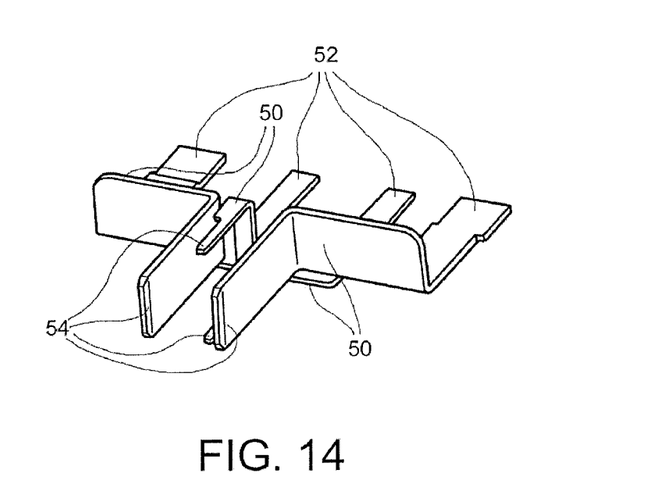
FIG. 14 illustrates a plurality of electrical terminals of the electrical connector in FIG. 13.

Referring to FIG. 13, the electrical connector 40 further includes a retention frame 70 extending horizontally forward from the front side 44 of the mounting portion, configured to engage with the motor 1, and thus further ensuring the stable relationship between the electrical connector 40 and the motor 1.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A motor, comprising a seat in which a plurality of motor terminals fixed, wherein the motor further comprises an electrical connector for connecting the motor and a cable connector, and wherein the electrical connector comprises:
   an electrically insulating main body, comprising a front side, and a rear side configured to be engaged with a corresponding cable connector; and
   a plurality of electrical terminals fixed by the main body, each of which comprising a front end protruded from the front side to connect corresponding motor terminal, and a rear end to connect corresponding end of the cable connector;
   the electrical connector is stably mounted on the seat, so that the front ends of the electrical terminals are placed in a stable connection with the motor terminals;
   wherein the seat extends outwardly from a motor body of the motor and comprises a groove isolated from the motor body of the motor, ends of the motor terminals are arranged inside the groove; and
   the main body further comprises a mounting portion, which is mounted to the seat in a sliding manner along an axial direction of the motor, so that the front ends of the electrical terminals are placed on the corresponding motor terminals.

2. The motor according to claim 1, wherein the front end of each electrical terminal directly contacts the motor terminal without welding.

3. The motor according to claim 1, wherein the motor is a brushless motor.

4. The motor according to claim 1, wherein the rear side of the main body is a socket in which the rear ends of the electrical terminals located, and the cable connector is a plug.

5. The motor according to claim 1, wherein distal ends of the rear ends in the rear side of the main body are mutually aligned.

6. The motor according to claim 1, wherein the main body further comprises a mounting portion, the seat comprises a corresponding retaining portion, and the mounting portion is mounted on the retaining portion.

7. The motor according to claim 1, wherein the mounting portion is substantially in a plate shape with two longitudinal grooves at two opposite sides thereof, the seat has two corresponding guide rails and an opening therebetween.

8. The motor according to claim 7, wherein the front end of each electrical terminal is stably placed on the motor terminal without welding.

9. The motor according to claim 1, wherein the seat mounted with the electrical connector is injected with an insulating resin.

10. The motor according to claim 1, wherein the main body further comprises a retention frame extending horizontally forward from the mounting portion, configured to engage with the motor.

11. The motor according to claim 1, wherein the electrical terminals comprise two power terminals and at least one signal terminal.

12. The motor according to claim 1, wherein a partition wall is formed between the seat and the motor body of the motor, with the motor terminals passing through.

13. The motor according to claim 1, wherein the ends of the electrical terminals and the ends of the motor terminals are oriented to face a bottom surface of the groove.

* * * * *